Patented Oct. 21, 1924.

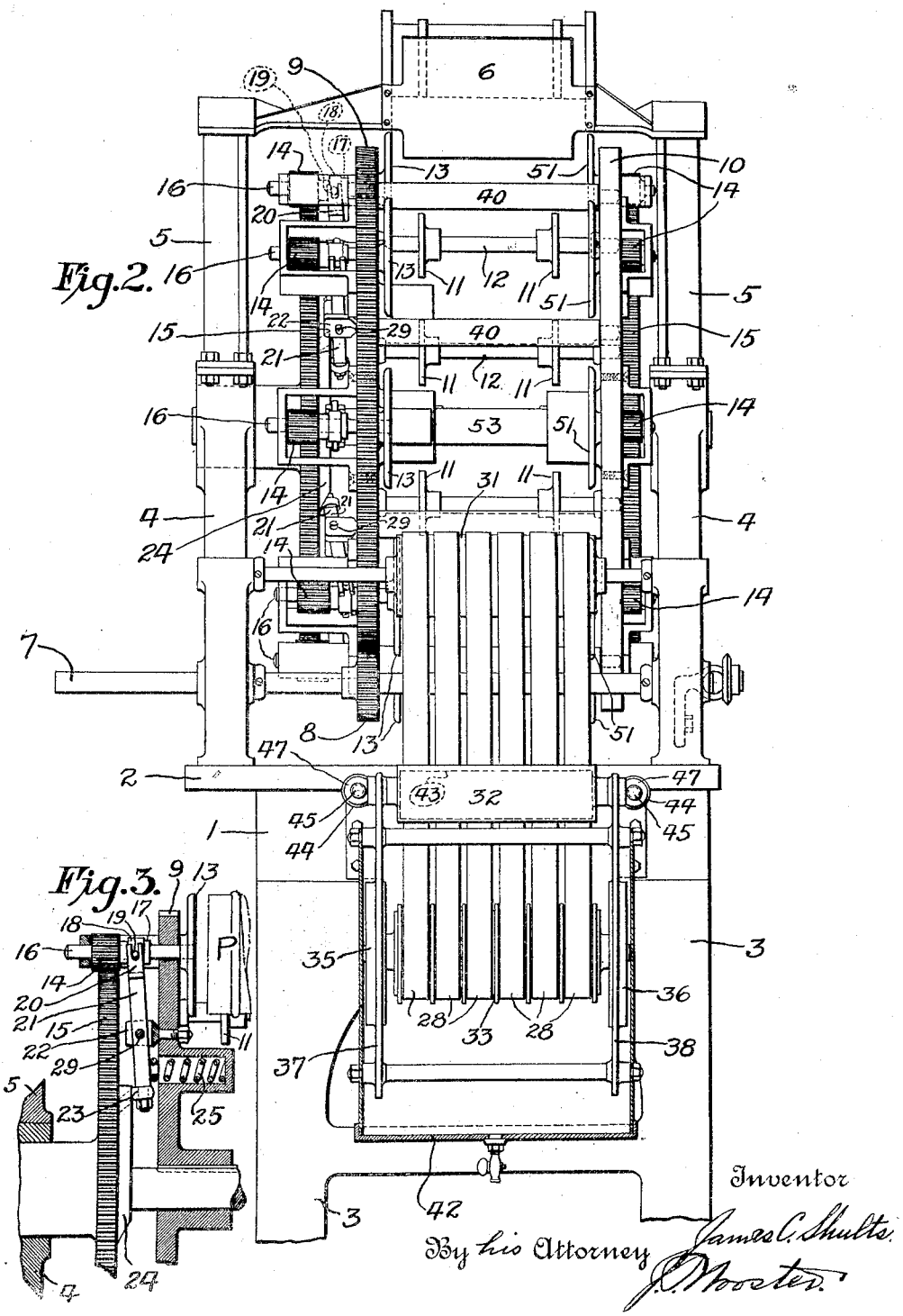

1,512,494

UNITED STATES PATENT OFFICE.

JAMES C. SHULTS, OF MEADVILLE, PENNSYLVANIA, ASSIGNOR TO RUSS AUTOMATIC LABELING CO., OF MEADVILLE, PENNSYLVANIA, A CORPORATION OF DELAWARE.

WRAPPING MACHINE.

Application filed July 20, 1920. Serial No. 397,606.

*To all whom it may concern:*

Be it known that I, JAMES C. SHULTS, citizen of the United States, and a resident of Meadville, in the county of Crawford and State of Pennsylvania, have invented certain new and useful Improved Wrapping Machines, of which the following is a specification.

This invention relates to wrapping machines, and the main object is to stretch the label during the wrapping process to evenly cover different diameters.

I accomplish this by a plurality of yielding wrapping belts contacting with the tempered label, while the packages clamped upon a revoluble head make several complete revolutions during the wrapping and stretching process, thus producing a smoothly labeled package free from wrinkles and accommodating inequalities in the diameter of the package. The package traveling faster than the wrapping belts pulls the label during its expansible period over the belts, thereby producing a wiping and stretching effect. The several revolutions of the package during the wrapping insures a smooth and tightly wrapped package, because the extra revolutions thoroughly set the surface and end lap of the label.

With these objects in view, my invention comprises the various features of construction hereinafter described in the following specification, pointed out in the claims, and illustrated in the accompanying drawings, in which:

Figure 2 is an end view,

Figure 3 is a fragmentary section showing one of the chuck plates in the opened position.

Figure 1:
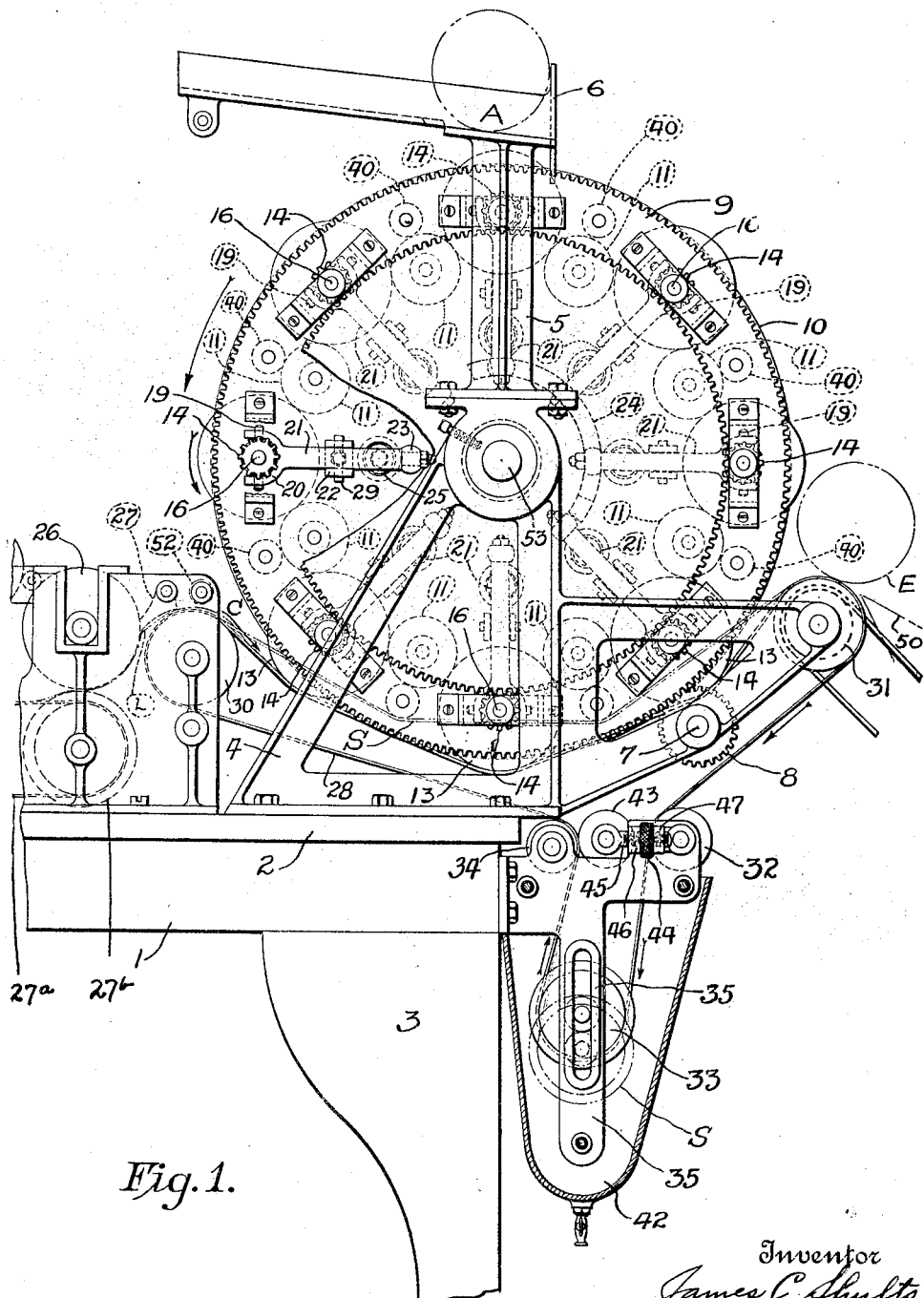
Figure 1 is a side elevation of the machine.

Referring to the drawings, 1 indicates the bed of the machine, 2 the bed plate, 3 the legs, and 4 the revolving head bearing brackets, upon which are mounted standards 5 supporting the package conveyor 6. Suitably arranged in extended portions of the bracket 4, is a drive shaft 7 having secured thereto a gear 8 for revolving the master driving head gear 9 and head plate 10, both of which are keyed to the shaft 53, the drive shaft 7 being driven by any suitable source of power. This constitutes the complete revoluble head, upon which are mounted the operating mechanism for receiving, holding and releasing the packages, which for example are of a cylindrical type, having varying diameters, such as are used for oats and similar cereal foods, baking powder, etc. As the package drops from the conveyor 6 into the revolving head, it is received between two centering discs 11, which automatically center or place the packages in proper position to be gripped by the chuck plates 13 and the base plates 51, forming a clamping device, which in its rotation is timed to receive the package when directly under the opening A of the conveyor 6. When the machine is in operation, all the chuck plates 13 and the base plates 51 are revolving continuously driven by pinion gears 14 having a planetary movement around the stationary gears or circular racks 15, secured to brackets 4 by means of a set screw 54. The pinion gear 14 is secured to the shaft 16 which is provided with a shoulder portion 17 adjacent to which is a loose collar 18 with a pin 19 engaging a yoke 20 of the rocker arms 21 pivoted at 29 to the removable brackets 22 fastened to the revolving head gear 9. A roller 23 rotatable on the end of each of the rocker arms 21 engages the cam or track 24 upon the right hand stationary gear or rack 15 during the rotation of the head, which actuates the rocker arm 21 whereby the chuck plate 13 opens outwardly from the base plate 51. One chuck plate and one base plate form one clamping unit, there being one clamping unit to each of the rocker arms 21 spaced apart upon the revolving gear head 9. As the package P (see Fig. 3) is received onto the centering discs, 11, the roller 23 leaves the cam or track 24, causing the rocker arm 21 under the tension of a spring 25, to move inwardly whereby the package P is gripped sufficiently for the labeling process.

L is the label which is fed under and against the paste roll 26 by belts 27$^a$ running between discs 27$^b$ and then stripped by strippers 27 and guided by the roll 52 onto the wrapping belts 28 which are driven at a greater speed than the paste roll 26. The belts 27$^a$ travel slower than paste roll 26, so that the latter pulls the label along by its adhesion to roll 26. The label as it travels on and with the yielding wrapping belts 28, is gripped between the relatively fast rotating package and the relatively slower moving wrapping belts 28, before it has entirely left the paste roll 26, and due to the greater speed where the label is gripped than the paste roll speed, it is here also slightly stretched before leaving the paste roll 26. The slower moving belts 28, moving in the same direction as the package and label now progressively wipe the label on the package as it is laid, stretching it where necessary over end caps, beads, etc. In order to secure a well pasted down lap of the label, three or more revolutions of the package are provided for, the wrapping belts 28 extending over the necessary portion of the revolving head to permit same. The wrapping belts 28, (or a single wide belt) are driven by the belt pulley 30 nearest the paste roll 26, passing around rolls 31, 32, 33 and 34. The roll 33 is weighted and slides in elongated bearings 35 and 36 of brackets 37, 38, to keep a certain fixed tension of the wrapping belts 28, the tension being such as to not damage the label during its wrapping process. This provides a yielding, pulling and wiping and stretching belt in addition to a pressure belt, and further allows for variation of diameter of the packages during their rolling and wrapping process. The weighted roll 33 also takes up the slack of the belts 28 when the revolving head carries no package between the chuck plate 13 and the base plate 51, the wrapping belts at such times travelling over spacer rolls 40, as seen in Fig. 1, illustrated at S.

The bearing brackets 37 and 38 are hung in a water box 42 and if necessary the wrapping belts 28 may pass through water which assures clean wrapping belts on their return to the roll 30 nearest the paste roll 26 for their next wrapping process. After the washing of the belts, they travel between the roll 34 and wringer roll 43 composed of rubber or the like, the bearings of which are made adjustable by a nut 44 threaded on an eye bolt bearing 45, one on each side of the roll, and extending through the stationary lugs 46 and 47 between which a thrust bearing is provided for the nut 44. The adjustment of the nut 44 provides for whatever desired pressure is necessary for taking the excess moisture out of the belts 28 after their washing.

The release of the package after wrapping is indicated by dotted form at E, the roller 23 having engaged the cam 24 which releases the gripping hold of the chuck plate 13. Suitable means may be provided for conveying the packages away, for example, a chute 50 is shown on which the package falls by gravity.

The salient feature of novelty herein is considered to be in the novel means for smoothly applying and stretching the label around the package and over end caps, beads, etc., without wrinkles or tearing, and obtaining both a straight and a completely adhering lap.

The label is rendered soft and stretchy by the adhesive, or previous tempering treatments (see Reissue Patent 13,940; Patent 1,246,668) and is then lightly pulled by the paste roll and then lightly stretched by the wrapping belt moving faster than the paste roll. While so held, and being progressed toward the labeling point while the rotary head is bringing the relatively rapidly rotating package to the labeling point, it is gripped between the package and the wrapping belt with sufficient wiping by the faster movement of the package periphery to prevent wrinkles, because the wiping is simultaneous with the laying. After the rear end of the label has left the feeding means, whether paste roll, as herein shown, or the gripping belts in said patents, the wrapping belt has a progressive wiping and smoothing as well as pressing action on the label, very much like manual labeling. Thus, the rapidly rotating and traveling package does the pulling and stretching while wiping or dragging the label over the stressed, slower moving wrapping belt in close contact therewith. Although in a broad aspect, it is not essential that the rotating package having a higher linear speed than that of the wrapping belt, be also moving bodily along and in the same direction as the belt owing to being carried on a rotatable head, this conjoint additional movement is advantageous in effecting the wiping and stretching and smoothing action. Also, it is preferable and advantageous to have the wrapping belt of such length that the package makes several complete revolutions before being discharged, thereby very effectively sealing the lap and holding the wiping and pressure until the partial evaporation of the moisture permits discharge without the label springing loose due to the contraction of the paper in drying. It will be further seen that there is a progressive increase of speed from belts 27ª to paste roll 26 to wrapping belt 28 to package peripheral speed so that there is no chance for the rear of the label to pile up on the front, which is one cause of wrinkles.

I claim:

1. The combination with means for rotating a package, of means for applying an adhesive tempered label to a package carried by the first mentioned means, said label applying means comprising a flexible belt for pressing and stretching the label onto the package, said belt having a speed different from the surface of the package.

2. The combination with means for moving and rotating a package, of means for supplying an adhesive tempered label behind and in the direction of rotation and travel of the package, and yielding means accommodating inequalities in the package for pressing and wiping the label on the package.

3. The combination with means for moving and rotating a package, of a belt contacting with the package, means for moving said belt at less than the linear velocity of the portion of the periphery of the package therewith contacting, and means for supplying between the package and said belt an adhesive tempered label, the adhesive side thereof being presented to the package.

4. The combination with means for moving and rotating a package, of a conveyor device receiving an adhesive tempered label and having a yielding portion traveling in the direction of movement and rotation of the package at less than the linear velocity of the adjacent portion of the periphery thereof, said conveyor device being in yielding contact with the package after receiving the label for progressively applying and stretching the label to accommodate inequalities of the package during the combined rotation and travel thereof.

5. The combination with means for moving and rotating a package, of means for supplying an adhesive label in the direction of rotation of the package, and pressing means traveling slower than the package in the same direction to press and wipe the label on the package at the point of application.

6. In a labelling machine, the combination with means for supporting a package, of means having a different speed relative to the surface of the package for pressing and wiping an adhesive tempered label from one end to the other to progressively stretch all parts thereof as the same is applied to the package.

7. The combination with means for rotating and bodily moving a package, of a flexible wrapping belt disposed in the path of movement of the package and tangent thereto to contact therewith, and means driving said belt at a lower speed than that of the package such as to progressively wipe and stretch the label on the package as the package rotates and travels along the belt.

8. The combination with means for rotating a package, of a flexible wrapping belt contacting with the package throughout a plurality of revolutions, means for driving said belt at less than the linear velocity of the portion of the periphery of the package therewith contacting, and means for supplying an adhesive label to the package.

9. The combination with a rotating carrier carrying package rotating means, of a flexible belt cooperating therewith to bear on the package throughout a plurality of revolutions while being carried by said carrier, means for driving said belt at less than the linear velocity of the portion of the periphery of the package therewith contacting, and means for supplying an adhesive label between the belt and package.

10. The combination with an adhesive label feeding means, of strippers, a belt receiving the labels from said strippers, a rotary package carrier, means for driving said belt at less than the linear velocity of the adjacent portion of the periphery of the package carried by said gripping heads, and rotating package gripping heads on said carrier, said belt being disposed to be deflected by the rotating packages during a portion of their travel on the carrier.

11. The combination with an adhesive label feeding means, of strippers, a belt receiving the labels from said strippers, a rotary package carrier, and rotating package gripping heads on said carrier, said belt traveling at a lower speed and being disposed to be deflected by the rotating packages during a portion of their travel on the carrier.

12. The combination with means for feeding an adhesive label at one speed, of label carrying means moving at a faster speed receiving the label from said feeding means, and package carrying means causing the package to move at a greater speed than said carrying means and contacting therewith to apply the label to the package before the label has completely left said feeding means thereby stretching the label.

13. The combination with a paste roll for feeding a label adhering thereto, of stripping means, a label carrier traveling at a faster speed to lightly stretch the label as it leaves the paste roll, and means for bringing a rotating package at a higher speed into the path of the label on said carrier to wrap and wipe the same on the package.

14. In a labelling machine, the combination with means for rotatably supporting a package, of a flexible belt having a different speed relative to the periphery of the package for pressing and wiping an adhesive tempered label from one end to the other to progressively stretch all parts of the label as it is applied to the package.

15. The combination with a rotatable package holder, of a yieldable traveling label supporting belt, the belt and package being moved at different rates of speed to stretch the label by the slipping of the label on either the belt or package.

16. The combination with a label wrapping belt, of a pair of pulleys over which said belt travels, a package holder adapted to rotate the package along said belt intermediate said pulleys with the contiguous peripheral portion of the package moving in the same direction as said belt but at a different rate of speed.

Signed at New York, in the county of New York and State of New York, this 16th day of July, A. D. 1920.

JAMES C. SHULTS.